United States Patent [19]

Spielman

[11] 4,347,438
[45] Aug. 31, 1982

[54] LIGHT TRANSCEIVER DEVICE

[76] Inventor: Richard Spielman, 4401 W. Pratt Ave., Lincolnwood, Ill. 60646

[21] Appl. No.: 241,674

[22] Filed: Mar. 9, 1981

Related U.S. Application Data

[62] Division of Ser. No. 5,002, Jan. 22, 1979, abandoned.

[51] Int. Cl.$^3$ .............................................. G01V 9/04
[52] U.S. Cl. .................................... 250/221; 250/222 R
[58] Field of Search ........................ 250/221, 222, 239; 324/178

[56] References Cited

U.S. PATENT DOCUMENTS

| | | | |
|---|---|---|---|
| 1,887,209 | 11/1932 | Lucas | 250/221 |
| 2,065,048 | 12/1936 | Burnside | 250/221 |
| 3,025,406 | 3/1962 | Stewart et al. | 250/221 |
| 3,752,978 | 8/1973 | Kahl et al. | 250/221 |
| 4,097,800 | 6/1978 | Kuchmas et al. | 250/222 R |

Primary Examiner—David C. Nelms
Attorney, Agent, or Firm—Silverman, Cass & Singer, Ltd.

[57] ABSTRACT

An improved light transceiver device for use in alarm or counting systems. The transceiver is housed in a light tight housing and includes an adjustable mirror offset from the active element of the transceiver. The mirror directs light through an aperture in the housing along a predetermined axis from the active element and directs light to the active element which is received through the aperture along the axis. The mirror deflects any light received through the aperture which is received at an angle greater than a predetermined angle from the axis around the active element of the transceiver to block ambient light interference. The transceiver also may be utilized in an improved light screen or barrier which may be utilized either for an alarm system such as in a jewelry case or in a counting system wherein objects are passed through the light screen in the frame to be counted.

9 Claims, 13 Drawing Figures

LIGHT TRANSCEIVER DEVICE

This application is a division of application Ser. No. 5,002, filed Jan. 22, 1979, now abandoned.

BACKGROUND OF THE INVENTION

The invention relates to an improved light transceiver including an adjustable mirror for deflecting ambient light around the transceiver to improve the sensitivity of the transceiver's operation.

For an alarm or counting system to work efficiently ambient light interference must be sufficiently attenuated or interruptions of the light beam will not be noticed, because the receiver is still receiving sufficient illumination to maintain the light level above the threshold of the receiving device. The failure of counting systems to discern between two separate objects passing through a light screen and one object interrupting the light beam more than once as it passes through the screen also will result in an erroneous or false count.

The prior art has developed several light screen devices for counting objects passed through the screen. U.S. Pat. No. 3,025,406 shows a light screen or barrier for ballistic uses including an adjustable mirror for directing the reflected light. U.S. Pat. No. 3,327,942 provides a light frame counter in a laundry environment. U.S. Pat. Nos. 3,383,517 and 3,584,226 are directed to light frame counters which include different means for eliminating false counts from the counting circuit. The problem of ambient light which interferes with the efficient operation of these devices is not overcome in the prior art. One attempt to eliminate ambient light interference in the prior art is a tube extending from the light receiver with its axis aligned with the light axis of interest to attempt to attenuate the outside interference.

SUMMARY OF THE INVENTION

The present invention provides an improved light transceiver which sufficiently attenuates ambient light interference to increase the sensitivity of the transceiver to light present along the axis of interest. The transceiver is mounted within a light tight housing having a single aperture through the housing. Light is directed to and from the transceiver through the aperture along the desired axis of interest by an adjustable mirror mounted within the housing and aligned both with the aperture and the active element of the transceiver. Light received through the aperture which is not along the desired axis is deflected by the mirror around the active element of the receiver to substantially eliminate light interference, enhancing the sensitivity of the transceiver to the light of interest. The transceiver may be utilized alone with an outside light source, in pairs with the light being directed from one to the other of the pair or with a light screen or barrier system wherein the light is directed back and forth across a frame to provide a light screen or barrier. The transceiver may include means for counting each interruption of the light received along the desired axis or for alarming when the screen is broken or both. In a counting system means may be provided to eliminate false counts and to check for possible malfunctions in the system.

DESCRIPTION OF THE PREFERRED EMBODIMENTS

As indicated above, the invention is concerned with an improved light transceiver which substantially eliminates ambient light interference which may be used in alarm or counting systems.

Figure 1:
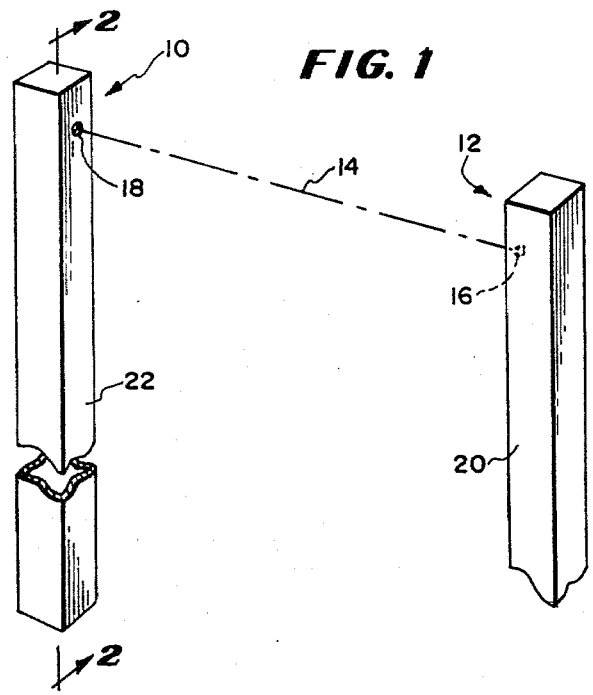
FIG. 1 is a perspective view of a pair of light transceivers of the invention utilizing a single light path segment.

Referring now to FIG. 1, the improved light transceiver of the invention is designated generally by the reference character 10 and is shown with a second transceiver 12. In operation a light beam 14 will be generated either by the transceiver 10 or the transceiver 12 and will be directed, for example, through an aperture 16 in the transceiver 12 to the transceiver 10. The light beam 14 is aligned to pass through an identical aperture 18 in the transceiver 10 where the light will be directed to the active element of the transceiver. The active elements of the transceivers 10 and 12 are enclosed in light tight enclosures 22 and 20, respectively.

The pair of transceivers 10 and 12 may be mounted such that the light beam 14 passes therebetween across an opening or space to be monitored. The transceiver 12 may be replaced with any type of light source providing the beam 14 with a light blocking radius as will be described with respect to FIG. 8. The two transceivers 10 and 12 will be mounted such as across a doorway, such that any time the light beam 14 is interrupted, as by a person passing between the light transceivers, the interruption of the beam may be utilized for an alarm or other visual or audio indication. The device also may be used as a counting device, with each time the light being interrupted, counted by a counter such as that described with respect to FIG. 9, to maintain a count of the number of people or other objects passing through the space and the light beam 14. By "interrupted", it is meant that the beam 14 will be broken and restored.

Figure 2:
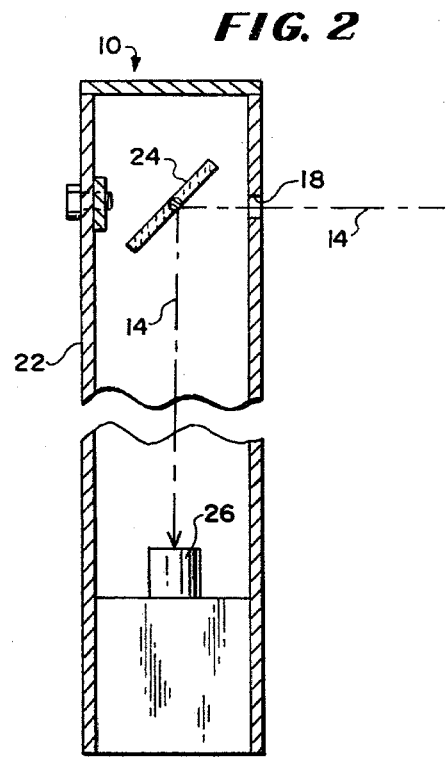
FIG. 2 is a sectional side view of one transceiver taken along line 2—2 of FIG. 1.
Figure 3:
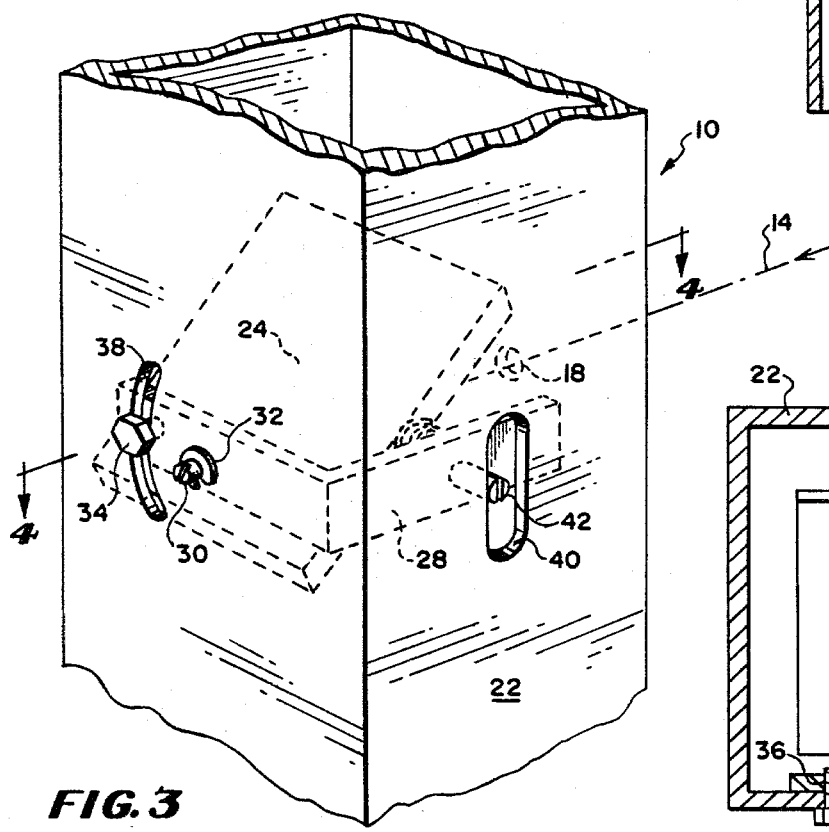
FIG. 3 is an exploded partial perspective view of the transceiver illustrating one type of adjustable light directing mirror.
Figure 4:
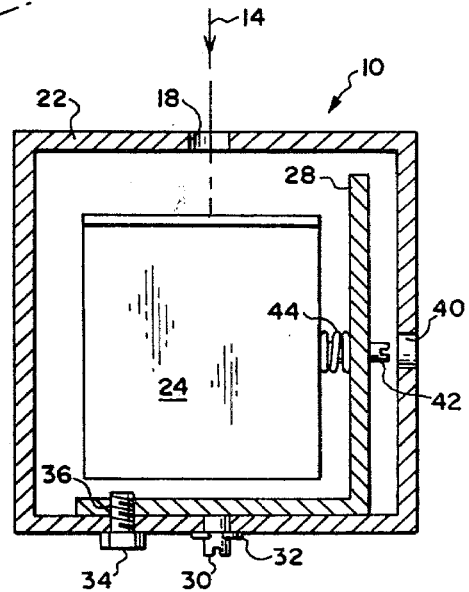
FIG. 4 is a sectional top view of the transceiver taken along line 4—4 of FIG. 3.

Since the transceivers 10 and 12 substantially are identical, only one transceiver 10 will be described in detail referring to FIGS. 2-4. The light beam 14 passes along a predetermined axis and is directed by an adjustable mirror 24 to an active element 26 of the transceiver. Light passing into the light tight enclosure or housing 22 through the aperture 18, which is not substantially along the axis of the beam 14, will be deflected by the mirror 24 around the active element 26 to eliminate ambient interference in the operation of the transceiver 10. The light beam 14 may be generated by a conventional light source, which will be received by the active element 26 which may be a conventional type of light transducer. The light deflecting capabilities of the transceiver 10 are more fully described with reference to FIG. 8.

The mirror 24 must be easily adjustable in all planes to align the light beam 14 for proper operation of the transceivers 10 and 12. One specific embodiment allowing adjustment of the mirror 24, without opening the cover of the light tight housing 22, is illustrated in FIGS. 3 and 4. The mirror 24 also may be mounted on a piece of pliable or bendable galvanized metal, as will be described with reference to FIG. 6. The mirror 24 is mounted on an L-shaped bracket 28 which is pivotable in a first plane around a pivot pin 30. The pin 30 may be secured to the outside of the housing 22 with a snap type washer 32. The mirror 24 may be pivoted around the pivot pin 30 by releasing an adjusting screw 34 which is secured to the bracket 28 by insertion in a tapped hole 36. When the adjusting screw 34 is backed off from a secure engagement with the housing 22, it then may be moved in a arcuate slot 38 until the mirror 24 is aligned in the proper angle in the first plane of movement. The screw 34 is then tightened against the housing 22 and the mirror 24 then may be adjusted in a second plane through an elongate slot 40.

The mirror 24 is mounted to the bracket 28 by an adjustable screw 42 which is fixed to the mirror and tapped through the bracket 28. The screw 42 is maintained in its angular position once it is aligned in the proper angle by the tension exerted by a spring 44 compressed between the mirror 24 and the bracket 28. Thus, the mirror 24 easily is adjustable in all planes to direct the beam 14 to and from the aperture 18 as desired. The slots 38 and 40 should not effect the operation of the elements in the light tight enclosure 22; however, the openings may be covered by making the bracket 28 wide enough that it will cover the opening of each of the slots. Adhesive tape or other types of covers also may be placed over the slots, if desired.

Figure 5:
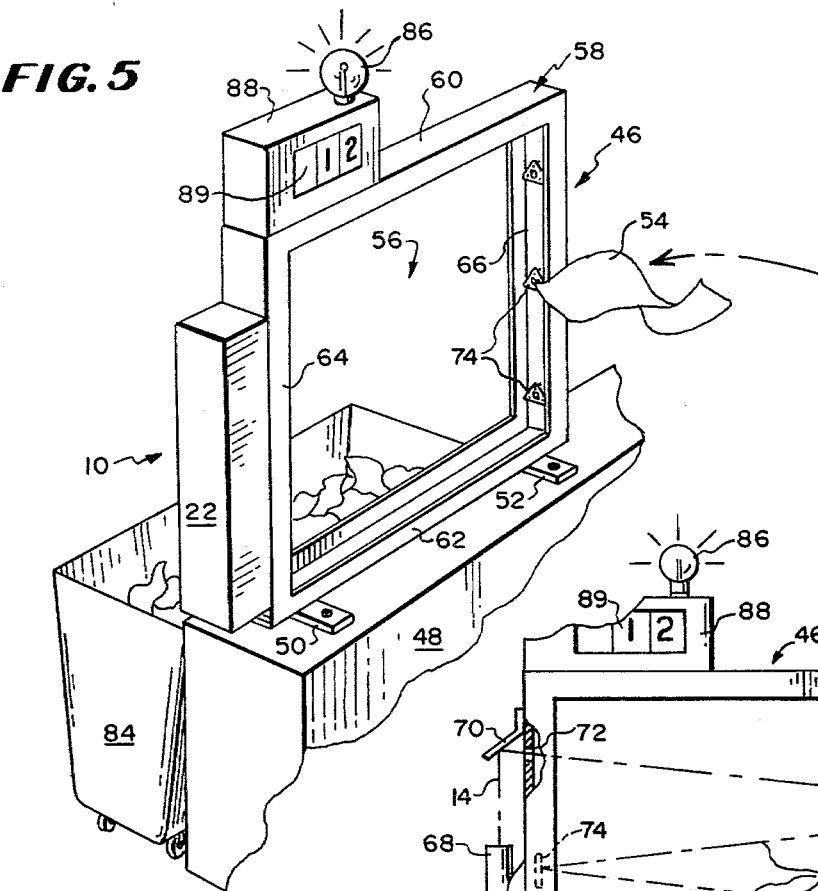
FIG. 5 is a perspective view of the transceiver mounted on a light screen or barrier device.
Figure 6:
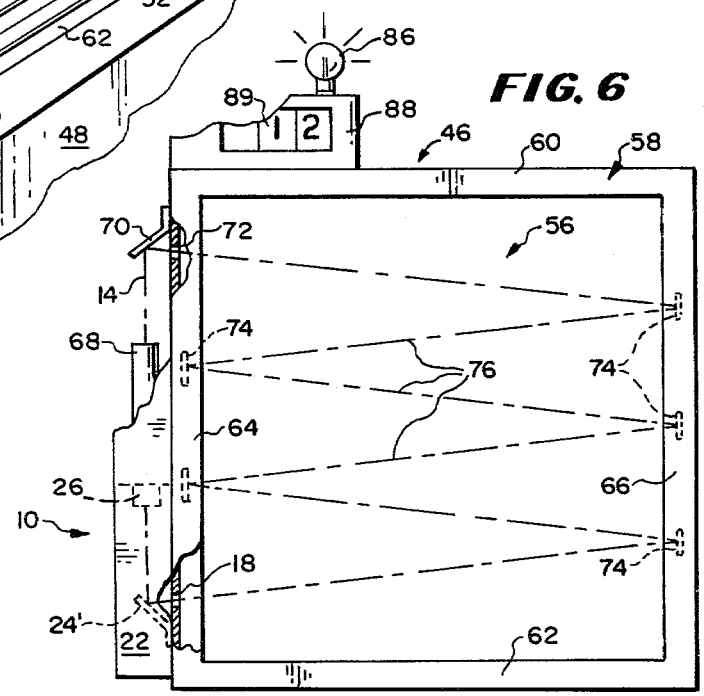
FIG. 6 is a plan front view with portions of the transceiver broken away of the light screen device.

As described above, the transceivers 10 and 12 may be utilized alone or in combination to provide a single path for the light beam 14 between the light source and the transceiver 10 or 12. Referring now to FIGS. 5 and 6, one of the transceivers, for example, the transceiver 10 may be utilized in combination with a light frame device 46 to provide a light screen or barrier for counting objects to be passed therethrough or for providing an alarm system. In this respect, the transceiver 10 is mounted on one side of the light frame device 46. The light frame device 46 is shown mounted on a bench or table 48 by a pair of brackets 50 and 52; however, the device 46 may be mounted on any of its surfaces and may be mounted directly by one portion of the frame without the brackets 50 and 52. The brackets or legs 50 and 52 may be mounted to the bench or table 48 by any convenient, conventional mounting means either permanently or removably, as desired.

The light frame device 46 is applicable to numerous types of operations, such as providing a screen over a jewelry case or other type of display area through which it is desired that an observer may see the objects, but may not reach them without causing an alarm by breaking the light screen. The device 46 also may be combined with a counter to count many types of objects; it however, being shown in FIG. 5 in a laundry or diaper counting environment. In this application, objects 54 to be counted are flexible clothes or diapers.

These flexible objects 54 take a finite period of time to pass through an opening or window 56 formed in the light frame device 46 and also provide a multi-faceted profile as they pass through the opening 56, which is of importance in the operation of the light frame device 46.

The light frame device 46 includes a light frame 58 which includes a top frame member 60, a bottom frame member 62 and a pair of side frame members 64 and 66. The members 60, 62, 64 and 66 are illustrated as U-shaped channel members which are preferable by reason of their strength and rigidity; however, the frame 58 may be made of other types, sizes and shapes of members as desired. The frame members 60, 62, 64 and 66 form the window or opening 56 through which the objects 54 are passed to be counted.

Referring now to FIGS. 5 and 6, a light source 68 also may be enclosed in the enclosure 22 of the transceiver 10. In FIG. 6, the transceiver 10 is mounted upside down, with respect to FIGS. 1 and 2, with its aperture 18 at the bottom rather than at the top. The light source 68 may be replaced by the transceiver 12 abutting the transceiver 10 or, as shown in FIG. 1, in which instance the transceiver 10 may be mounted with the transceiver 12 mounted on the opposite side of the opening 56 on the frame member 66. The light source 68 again may be a conventional type of light source which will form the light beam 14. The beam 14 is directed by a second adjustable mirror 70 which would also be enclosed within the enclosure 22 or within a separate enclosure with the light source 68 if a separate source is utilized. The beam 14 is directed by the mirror 70 through a second aperture 72 to the first of a number of individual mirrors 74.

The light beam 14 is reflected back and forth between the mirrors 74 to form a light screen or barrier 76, having a number of individual light segments, the last one of which is directed through the aperture 18 and directed by an adjustable mirror 24' to the active element 26 of the transceiver 10. The light may be directed through fiber optics to the element 26 at a remote location. The adjustable mirrors 70 and 24' may be a angular piece of pliable metal, such as galvanized metal, onto which a reflective surface is formed or adhered and which may be bent manually to provide the necessary minor adjustments of the mirrors 24' and 70.

The mirrors 74 are mounted to the inside of the channel shaped members 64 and 66 and are individually aligned such that the screen 76 is formed by the light beam 14 directed back and forth between the various mirrors. The number of the mirrors 74 is not critical and in fact, depending upon the function of the system 46, may be a single mirror 74 mounted on the frame member 66 or may be eliminated entirely if a single beam segment is sufficient, such as described in FIG. 1, for the size and shape of the opening 56 and object 54 which is passed through the window.

The mirrors 74 also may be replaced by a single longitudinal mirror extending the desired length inside each of the frame members 64 and 66 or by prisms to form parallel light segments. The orientation of the members 64 and 66 to receive the mirrors 74 is also merely one of choice and may also be the top and bottom members 60 and 62, or all the members if desired. The individual mirrors 74 are the preferred embodiment over a single large mirror, since they are individually adjustable and replaceable and provide less surface area to be hit by an object 54 passing through the opening 56, assuming one of the objects 54 or other foreign objects would be hard enough to break the mirror surface. The mirrors 74 could also be replaced by fiber optic devices.

As described above, the light beam 14 passing from the last mirror 74 into the interior of the frame is directed through the hole 18 in the frame member 64. The beam 14 is then directed by the mirror 24' to the active element 26 of the transceiver 10. The active element 26 may be part of the light source 68 or could be a separate unit within the same cover 22 or a separate cover. The mirror 24' deflects all unwanted light around the element 26 as described with reference to FIG. 8.

In the instance of a single light beam segment directed across the frame opening 56, the second hole 18 would be in the frame member 66 with the second mirror 24' mounted on the outside of the frame member 66. The mirror 24' would again direct the light beam 14 to the active element 26 which also conveniently would be mounted on the frame member 66 under its cover 22, but could be mounted separately.

Figure 7:
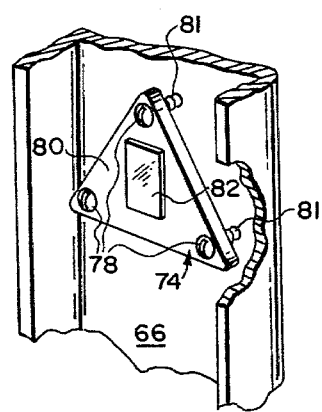
FIG. 7 is an exploded perspective view of one of the plurality of mirrors which form the light screen.

One of the adjustable mirrors 74 is illustrated in FIG. 7. Each mirror 74 is mounted to the frame member 66, for example, by three adjustable screws 78. The screws 78 are mounted through a plate 80 and tapped into the frame member 66. The screws 78 are adjusted between the plate 80 and the frame 66 against the tension of springs 81 which maintain the plates 80 in the proper alignment. Each of the plates 80 includes a mirror or reflective surface 82 from which the light beam 14 is reflected. The small surface area of the reflective surface 82 is advantageous for cleaning and replacement if it should become dirty and/or broken.

In operation, each of the mirrors 74 of the device 46 is aligned to form the light screen 76 illustrated in FIG. 6. The objects 54 are caused to pass through the light screen 76, which has a spacing between segments chosen such that the objects 54 will not pass through the screen 46 without interrupting at least one of the segments of the light beam 14. The objects 54 may be passed through the opening 56 into a laundry basket or other receptacle 84. Each interruption of the light screen 76 by an object 54 passing through it may be utilized to cause an alarm audially or visually such as by a light 86, or may be counted in a counting device 88 which may be displayed on a display 89.

The elimination of false alarms or false counts and the increased sensitivity of the transceiver 10 and light frame device 46 is provided by the ambient light blocking features as described with reference to FIG. 8. Utilizing the transceiver 10 with the transceiver 12 or with the light frame device 46, either to provide an alarm for an unwanted object passing through the light beam 14 or to count the objects interrupting the light beam, it is most important that the transceiver 10 eliminate ambient light and other types of spurious light interference. Light interference will cause a valid alarm or count to be lost because when the beam 14 is interrupted the element 26 is still receiving sufficient light to maintain its threshold and therefore will miss the alarm or count.

Figure 8:
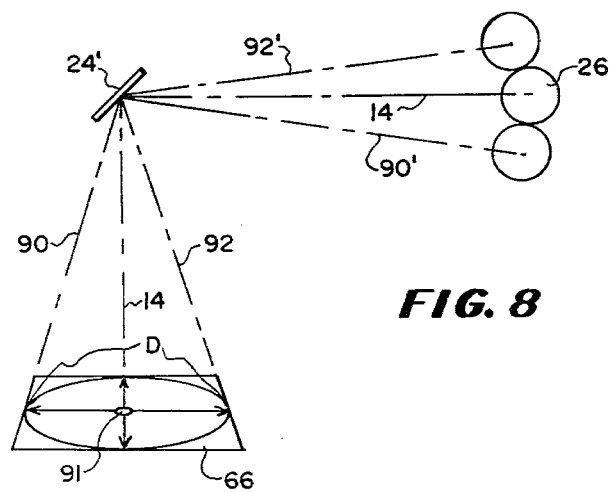
FIG. 8 is a diagramatic view of the ambient light blocking feature of the transceiver.

The transceiver of the invention receives only light directed along the predetermined axis, for example between the apertures 16 and 18 in FIG. 1 or from the last mirror 74 through the aperture 18 in FIG. 6, which is directed by the mirror 24 or 24' to the active element 26, because of the light blocking features shown in FIG. 8. For example, utilizing the frame member 66 and the mirror 24', the light must be directed along the desired path or it will be deflected by the mirror 24' around the active element 26 of the transceiver 10. The frame member 66 or other light generating member such as the transceiver 12 in FIG. 1 has a diameter "D" which extends on both sides of the center 91 of the last mirror 74 or around the aperture 16 in the transceiver 12. This diameter "D", the mirror 24 or 24', the distance between 66 and 24' and 26 provides the light blocking feature of the invention.

The beam 14 directed from or through the center 91 of the diameter "D" is reflected by the mirror 24' directly to the active element 26. Ambient light passing around the frame 66 or a shield with diameter "D" from either side shown as 90 and 92, for example, would be reflected by the mirror 24' along the paths 90' and 92' which will pass around the active element 26. Therefore, there is no interference from these light paths which are the closest light paths to the diameter "D". Other stray or ambient light received at an angle greater than this predetermined angle will be deflected even farther from the active element 26 as will all other light outside of the diameter "D". This deflection of the spurious or ambient light by the mirror 24', set at an angle to the incidence path of the desired light beam 14, eliminates all light outside of the predetermined angle from being received by the active element 26. Thus the sensitivity of the transceiver 10 is greatly enhanced.

Figure 9:
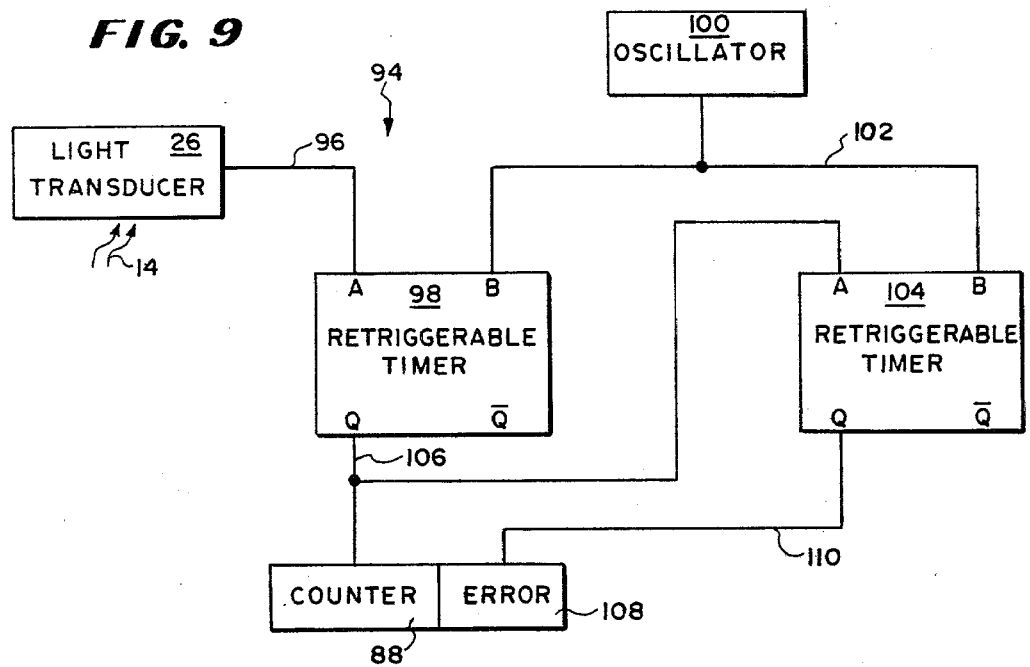
FIG. 9 is a block diagram of the multiple count eliminator and count validation circuit of the counting device.

A multiple count eliminator and count validation circuit 94 may be provided with the light frame device 46 as illustrated in FIG. 9. The light receiver or transducer 26 generates a logic high (1) while the light screen 76 is uninterrupted. When the light screen 76 is interrupted, causing the light transducer 26 to momentarily quit receiving the light beam 14, the transducer will generate a logic low (0) on a line 96 which is coupled to a first input A of a retriggerable timer 98. A clock oscillator 100 is coupled to a second input B of the retriggerable timer 98 by a line 102 which is also coupled to the input B of a second retriggerable timer 104. The output Q of the retriggerable timer 98 is coupled to the counter or counting device 88 by a line 106 which is also coupled to the input A of the timer 104. The output Q of the timer 104 is coupled to an alarm or error indication device 108, which may be the light 86 shown in FIGS. 5 and 6, by a line 110.

The operation of the multiple count eliminator and count validation circuit 94 will be discussed utilizing the timing diagrams illustrated in FIGS. 10A–10D. The oscillator 100 generates a series of clock pulses 112 which are coupled to both retriggerable timers 98 and 104.

Figure 10A:
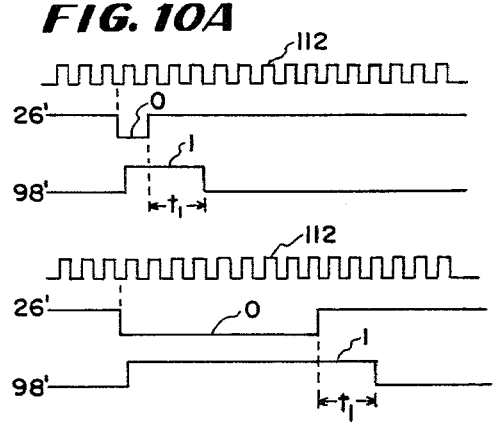
FIGS. 10A, 10B, 10C and 10D are various timing diagrams illustrating the operation of the count eliminator and count validation circuits of FIG. 9.

Referring first to FIG. 10A, the ideal situation is illustrated for an object 54 which interrupts the light screen or barrier 76 only once as it passes through the opening 56 of the light frame device 46. In this example, the output of the light transducer or active element 26 is illustrated by the two wave forms 26'. When the beam 14 is interrupted the light transducer 26 generates a logic low (0) which is coupled to the retriggerable timer 98. The output of the retriggerable timer 98 will then generate a logic high (1) (wave form 98') which is coupled both to the counter 88 and to the retriggerable timer 104. The logic high (1) from the retriggerable timer 98 will continue after the end of the logic low (0) from the light transducer 26 for a predetermined time-out period $t_1$ which is preset in the retriggerable timer 98.

Therefore, as illustrated in FIG. 10A both sets of the wave forms shown, are valid counts because the retriggerable timer 98 is allowed to time-out for the time period $t_1$ prior to receiving the next logic low from the light transducer 26. The upper wave forms 26' and 98' show the effect of a smaller or shorter object which interrupts the light screen 76 for a shorter period of time than the object represented in the lower wave forms 26' and 98'. Each pair of these wave forms represent the ideal situation; however, an object 54 may twist or tumble such that the light pattern or screen 76 is interrupted (broken and restored) several times as the object 54 passes through the opening 76. This is especially a problem with a flexible item, such as a diaper or other cloth item, which may also have ragged edges which interrupt the various light segments of the screen 76 a number of times as a single object passes through the screen.

The time period $t_1$ depends upon the type of item 54 which is to be counted, for instance, for a diaper the time-out period it is approximately one tenth of a second. This represents a time period $t_1$ which is slightly greater than the longest time a single object 54 can restore the beam 14 as it passes through the opening 56.

Figure 10C:
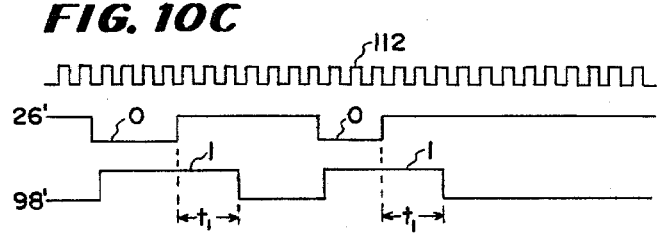
Figure 10B:
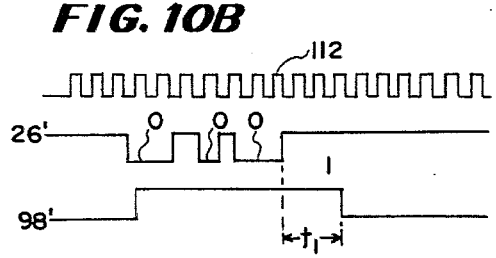

FIG. 10B illustrates a multiple number of interruptions for one item 54 passing through the opening 56. These interruptions may be caused by the object 54 being twisted or tumbling or otherwise providing a profile such that it interrupts the light screen 76 three times as it passes through the opening 56. As can be seen however, the counter 88 has received only one valid count from the retriggerable timer 98 (wave form 98'), because the timer was retriggered by the succeeding two interruptions after the first interruption before it could time-out for its time-out period $t_1$. Since the timer 98 did not time-out between the interruptions of the light pattern 76, only one valid count (wave form 98') is presented by the multiple interruptions of the object 54 passing through the opening 56. Each logic low received by the retriggerable timer 98 retriggers the timer for an additional time-out period of $t_1$.

For two valid counts to be recorded the time-out period $t_1$ must exist between each of the logic lows generated by the light transducer 26. Thus is illustrated in FIG. 10C, the first logic low from the transducer 26' terminates and the retriggerable timer 98 times out for the period $t_1$ so that the second logic low will cause a second valid count after another time-out period of $t_1$.

Figure 10D:
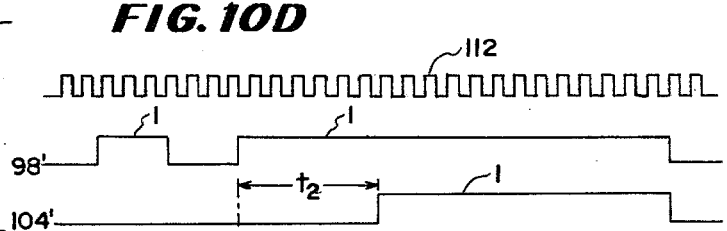

It is conceivable that an object 54 passing through the opening 56 could get caught on the frame 58 in such a way as to obstruct the light beam 14 and thereby impair the regular functioning of the light frame device 46. FIG. 10D is a diagram of the wave forms 98' from the timer 98 and 104' from the retriggerable timer 104 indicating the detection and sounding of an alarm when this error condition is present. Other possible malfunctions which may be detected in this same manner include a dirty, broken or misaligned mirror 74, the light source 68 failing or the transceiver 10 malfunctioning or becoming disconnected. The second retriggerable timer 104 receives each of the logic high signals from the output of the retriggerable timer 98. The retriggerable timer 104 has a second time-out period $t_2$ which has a time period greater than the maximum possible time that it takes for the particular object 54 of interest to pass through the opening 56. This time period $t_2$ is chosen so that when the retriggerable timer 98 has generated a logic high for a sufficient time for the retriggerable timer 104 to time-out for the time period $t_2$ without being reset, an alarm condition exists. When the alarm condition exists the retriggerable timer 104 will generate a logic high (1) on the line 110 to cause the error indicating device 108 to generate the error alarm or signal. The operator then may clear the stuck object 54 or clean the mirror 74 that is dirty or otherwise repair the light frame device 46 as necessary.

Many modifications and variations of the present invention are possible in light of the above teachings. It is, therefore, to be understood that within the scope of the appended claims, the invention may be practiced otherwise than as specifically described.

What it is desired to secure by Letters Patent of the United States is:

1. An improved light transceiver for transmitting and receiving a light beam along a predetermined light path, said transceiver comprising:
   a frame having spaced apart side members,
   one of said side members including an enclosure and having an opening aligned with said path but otherwise being light tight,
   a light source for emitting a light beam and being located within said enclosure,
   an aperture in said enclosure to permit passage of light from said source toward said other side member,
   light receiver means secured within said enclosure including an active element to receive said light, said element being offset from said opening,
   light directing mirror means on said other side member for receiving the light beam from said source and directing it along said path into said opening in the enclosure, and
   light reflecting means secured within said enclosure offset from said element and aligned with said opening, said light path and said element for directing light passing trough said opening from said source to said active element, said reflecting means directing substantially all light received at an angle from said path to positions around and away from said receiver active element.

2. An improved light transceiver as set forth in claim 1 and further including at least one adjustable mirror means on said enclosure facing said other side member and at least one additional mirror means on said other side member spaced from said light directing mirror means, whereby said beam is reflected in a pattern back and forth across said frame to form a plurality of light path segments, the axis of the last one of said light path segments being aligned with said opening.

3. An improved light transceiver as defined in claim 2 wherein said mirror means on the side members are oriented at an angle to the received light beam and serve to direct the beam back and forth across said frame.

4. An improved light transceiver as defined in claim 3 wherein said frame has a width such that ambient light passing around said frame across and through said opening will be deflected by said light reflecting means around said receiving means and away therefrom.

5. An improved light transceiver as defined in claim 3 wherein, said light beam is reflected back and forth across said frame in a pattern forming a light screen before being received by said light receiving means, said light beam being reflected at each point by said mirror means mounted on said frame with the mirror means furthest along the light path from said source directing the light beam through said opening to said light reflecting means.

6. An improved light transceiver as defined in claim 1 and further including means for counting interruptions of said light beam.

7. An improved light transceiver as set forth in claim 6 wherein said counting means include means for suppressing false counts caused by an object to be counted interrupting said light beam multiple times, said counting means including first retriggerable timer means which are retriggered each time said beam is interrupted and which includes a predetermined time-out period before said counter registers a valid count.

8. An improved light transceiver as set forth in claim 7 wherein, said counting means includes validation means for determining whether said light transceiver is operating correctly, said means including a second retriggerable timer means having a second predetermined time-out period which is retriggered each time said beam is broken, said second period being greater than the longest time it should take an object to pass through said beam such that said second period will only time-out if said light transceiver has malfunctioned.

9. An improved light transceiver as defined in claim 1 and further including alarm means for generating an alarm signal when the light received along said axis is interrupted.

* * * * *